(12) United States Patent
Kondziela

(10) Patent No.: US 6,757,358 B1
(45) Date of Patent: Jun. 29, 2004

(54) METHODS AND APPARATUS FOR A MONITORING SERVICE

(75) Inventor: James Mark Kondziela, Stamford, CT (US)

(73) Assignee: Verizon Services Corp., White Plains, NY (US)

(*) Notice: Subject to any disclaimer, the term of this patent is extended or adjusted under 35 U.S.C. 154(b) by 109 days.

(21) Appl. No.: 10/142,400

(22) Filed: May 9, 2002

(51) Int. Cl.⁷ .............................................. H04M 11/00
(52) U.S. Cl. ................... 379/38; 379/49; 379/88.23; 379/201.01
(58) Field of Search ..................... 379/37–51, 67.1, 379/88.01, 88.13, 88.18, 88.22, 88.23, 88.26, 201.01, 202.01, 207.01, 211.01, 68, 74

(56) References Cited

U.S. PATENT DOCUMENTS 5,878,116 A * 3/1999 Scott ......................... 379/67.1
6,310,939 B1 * 10/2001 Varney ...................... 379/88.01

* cited by examiner

Primary Examiner—Wing F. Chan
(74) Attorney, Agent, or Firm—Leonard C. Suchyta, Esq.; Joel Wall, Esq.; Michael Straub, Esq.

(57) ABSTRACT

Methods and apparatus for providing a monitoring service using a speakerphone and monitoring device coupled by a telephone line are described. A call is placed to the monitoring device and the speakerphone is then left off the hook. The monitoring device records received sounds and monitors for signals indicating an attempt to place a call. If DTMF tones corresponding to a phone number are received, the monitoring device initiates a call to the received phone number and bridges the initiated call with the call from the speakerphone. A call can be placed to the monitoring device to access recordings of audio from the speakerphone, monitor sounds from the speakerphone in real time and/or select stories, music or messages to be supplied by the monitoring device to the speakerphone at times specified by the caller.

19 Claims, 6 Drawing Sheets

METHODS AND APPARATUS FOR A MONITORING SERVICE

FIELD OF THE INVENTION

The present invention is directed to communication systems and, more particularly, to methods and apparatus for providing a monitoring service, e.g., a home monitoring service.

BACKGROUND OF THE INVENTION

Households with two working parents are becoming more common in our society. Since both of the adults are out of the house for a substantial part of the day, it is becoming more challenging to take care of, and monitor the status of, loved ones, e.g., children and/or the elderly. Even when a child is old enough to be left alone in the house, a parent may wish to monitor the home environment so they know their child is safe.

One way families care for their loved ones is by hiring caretakers, e.g., nannies or nurses. Unfortunately, caretakers cannot always be trusted since there have been cases of baby-sitters abusing or otherwise improperly taking care of children. This leads to a desire to monitor new caretakers so parents can be reassured of the safety of their children. In addition, children may be uncomfortable with a stranger, and may desire the ability to quickly contact someone who is familiar, i.e., a parent.

Some answering machines known in the art allow homeowners to call their house, enter a password, and listen to the activity in their home. These machines may be used to listen to a new caretaker from a remote location, but there are certain desirable functions that are not met by the answering machine monitoring technique. For example, calling your answering machine and listening ties up the line. Therefore people at home are not able to make outgoing phone calls, e.g., "911" calls while the monitoring is ongoing. In addition, use of an answering machine as a simple listening device fails to produce a recording of ongoing activity which can be accessed subsequently. A record of activity in the home is useful when it is not possible to continuously listen to ongoing activity. This way the adult will not miss any important activity while they are away from a phone.

Accordingly, there is a need for methods and apparatus for a monitoring service that creates a record of activity that can be subsequently accessed at a user's convenience and allows people in a home to make outgoing phone calls. From a convenience and safety standpoint it is desirable that a monitoring service not prevent calls, e.g., emergency "911" calls, being made from the monitored residence.

SUMMARY OF THE INVENTION

The present invention is directed to methods and apparatus for providing a monitoring service, e.g., for monitoring a child or an elderly parent from a remote location.

The system of the present invention includes a speakerphone and monitoring device having recording/playback capabilities, which is coupled to the speakers. The speakerphone is located at the area to be monitored, and is coupled to the recording/playback device by, e.g., a conventional telephone line and telephone switch. The recording/playback device may be, e.g., a peripheral device which is coupled to the telephone switch. In the context of the present application, a speakerphone is to be interpreted broadly and includes, e.g., telephony devices which can be used without a handset and/or are capable of receiving and transmitting audio signals present in a room without the need to speak directly into a handset.

The method of the present invention includes operating the monitoring device, e.g., an intelligent peripheral (IP) device coupled to the telephone switch, to receive a first telephone call from a speakerphone. The calling party is identified and verified, e.g., by checking a personal identification number (PIN) and a password, entered by the calling party, against stored information. Then, the calling party leaves the speakerphone off the hook, and continues on with their day. Next, the IP begins monitoring by recording audio signals received from the speakerphone.

In some embodiments the IP may offer the calling party a list of service options, such as leaving a personal message to be played at times designated by the calling party, or playing a list of prerecorded messages, e.g. songs and/or stories, that the calling party can choose from, and which will be played at times designated by the calling party.

While monitoring the first call for sounds, the IP also monitors for DTMF tones and/or speech indicating an attempt to make a call. If the IP receives DTMF tones or speech corresponding to a phone number, the IP will initiate a call to the phone number and bridge the initiated call with the first call. When the called party terminates the initiated call, e.g., by hanging up, the IP terminates the initiated call. The first call remains active and the IP continues monitoring the first call. In some embodiments the IP may stop the recording of sounds from the first line during the time the initiated and first calls are bridged.

At a time following initiation of the first call, the IP may receive a second telephone call, placed by the monitoring service subscriber, from a telephony device other than the speakerphone. At this time the calling party is given a plurality of service options. For example, the IP can play back the recordings of the audio signals received from the speakerphone, the IP can bridge the second and first calls so the calling party can monitor the first call in real time, the IP can record personal messages left from the calling party and receive times, e.g., a day and time, at which the message should be played. In addition, the caller can select from a list of prerecorded messages, e.g., songs and/or stories, which are to be played via the speakerphone at times specified by the caller.

Various additional features and advantages of the present invention will be apparent from the detailed description which follows.

DETAILED DESCRIPTION

Figure 1:
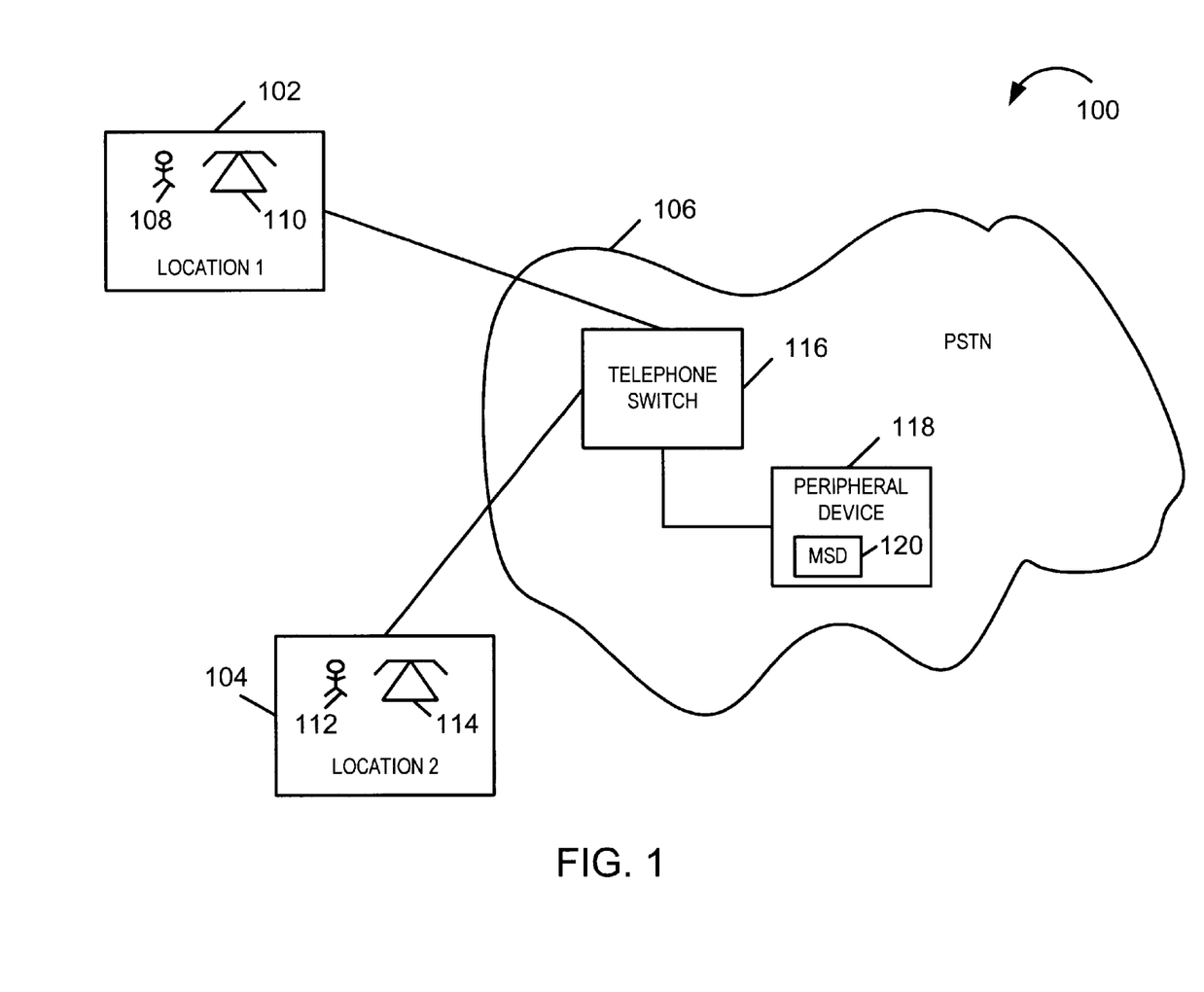
FIG. 1 illustrates a communication system implemented in accordance with an exemplary embodiment of the present invention.

FIG. 1 illustrates a communication system 100 implemented in accordance with an exemplary embodiment of the present invention. The system 100 includes routines, call processing logic and hardware for providing the communications service, e.g., monitoring service, of the present invention. The system 100 supports communications between various different locations via the public switched telephone network (PSTN) 106. Communications system 100 includes location 1 102, location 2 104 and PSTN 106.

Location 1 102 includes communications equipment 110 and a person 108, and is coupled to the PSTN via telephone switch 116. In accordance with the invention location 1 102 is the exemplary location that is to be monitored, e.g., a home. The communications equipment 110 is, e.g., a telephone with speakerphone capability, and the person 108 represents, e.g., a child or an elderly parent, that needs to be monitored. In addition the person 108 may also represent a caretaker that was hired to care for a child or an elderly parent. Subscribers can use the service to make sure the caretaker is doing a good job.

Location 2 104 includes communications equipment 114 and a service subscriber 112, and is coupled to the PSTN via telephone switch 116. Location 2 104 is an exemplary remote location from which the service subscriber 112 can call to monitor location 1 102. Therefore, location 2 104 can represent a number of different places, and communications equipment 114 can represent a plurality of different communications devices. For example, the service subscriber 112 may be calling from work using a landline phone or a mobile phone, or the subscriber 112 may be calling from the car using a mobile phone. Alternatively, the subscriber may be using the monitoring service of the present invention as a baby monitoring device and may be calling from a second location in the same home using a mobile phone or a second phone line.

In the exemplary communications system 100 the PSTN 106 includes a telephone switch 116 and a peripheral device 118 that is coupled to the telephone switch. The telephone switch 116 serves as a signal switching point (SSP). The PSTN 106 also includes a plurality of additional signal switching points (not shown). SSPs, as is known in the art, may be implemented using known Class 4 and/or Class 5 telecommunications switches, e.g., telephone switches of the same type as switch 116. Telephone switch 116 may correspond to a telephone central office. Trunk lines, which may comprise, e.g., one or more T1 lines, interconnect the various SSPs, e.g., telephone switches 116, that make up the PSTN 106. In system 100 the two locations 102 and 104 are coupled to the telephone switch 116, but in various other embodiments the two locations 102 and 104 may be coupled to separate telephone switches that are part of the PSTN 106.

Peripheral device 118 hangs off of the telephone switch 116. Peripheral device 118 may include control logic making it an intelligent peripheral (IP) device. The IP 118 is coupled to the telephone switch 116 via audio lines and data lines allowing it to perform various services relating to calls received by the switch 116. In an exemplary embodiment, the IP 118 is implemented as an interactive voice response (IVR) peripheral device which is capable of, and includes circuitry for, performing speech recognition and/or DTMF signal detection operations as well as playing voice prompts and other messages to a service subscriber, e.g., to a monitoring service subscriber. IP 118 also includes a recording device allowing it to make and playback voice recordings. As will be discussed below, audio recordings may be provided to a monitoring service subscriber in response to a call placed to IP 118.

In system 100 embodiment the peripheral device 118 hangs directly off of the telephone switch 116 that directly services the monitoring location 1 102, but in various other embodiments the peripheral device 118 may be coupled to another telephone switch, in a remote location, and voice and data information would be passed to the telephone switch through the PSTN 106. In a third embodiment the peripheral device 118 can be implemented outside of the PSTN 106 by, e.g., a private search provider having connections to the PSTN 106.

Figure 2:
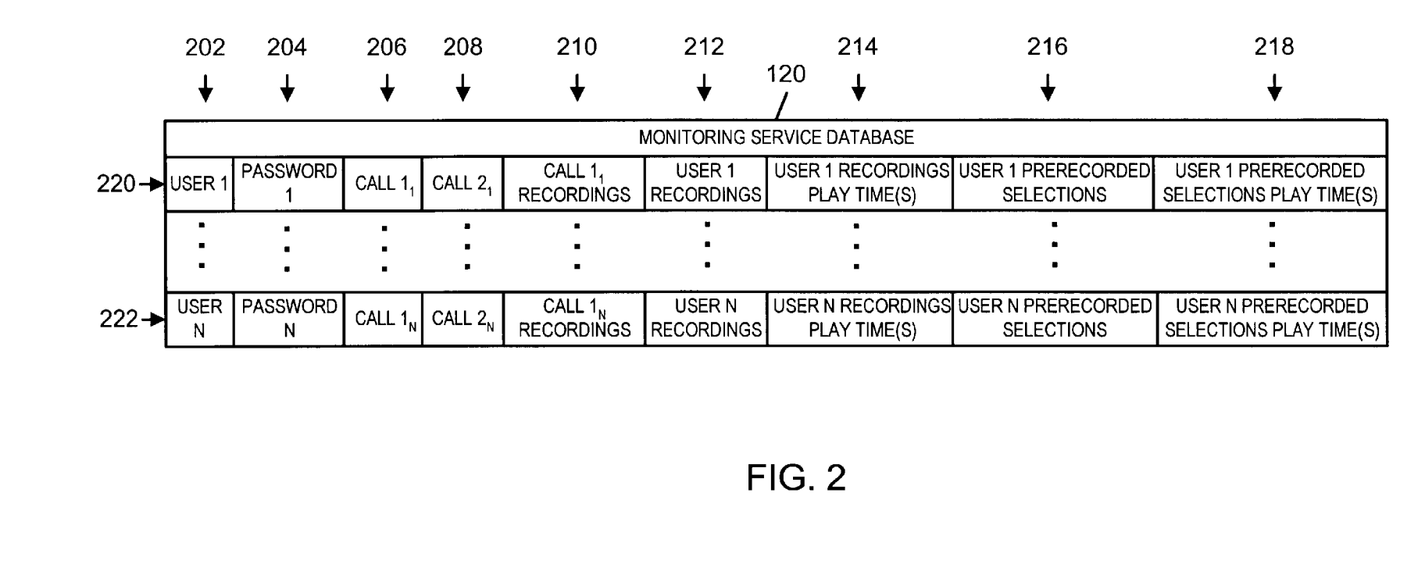
FIG. 2 illustrates an exemplary monitoring service database implemented in accordance with the invention.

Peripheral device 118 includes a monitoring service database (MSD) 120 implemented in accordance with the invention. The MSD 120 includes subscriber information associated with the monitoring service of the present invention. The MSD 120 may be stored in the peripheral device 118 as shown in system 100, but the MSD 120 may also be stored in a separate location that is accessible on demand to the peripheral device 118. An exemplary MSD 120 is shown in FIG. 2.

Exemplary MSD 120 includes nine columns and a number, N, of rows. Each row of information 220, 222 corresponds to a different monitoring service subscriber. The first column 202 includes monitoring service user identification information, e.g., a personal identification number (PIN). The first two columns 202 and 204 are used to identify qualified monitoring service subscribers. The second column 204 includes monitoring service user passwords. Column 206 identifies a first call, which corresponds to the monitored line. The monitored line remains connected with the peripheral device 118 throughout a monitoring session. Column 208 identifies a second call, which is made by a subscriber, seeking to monitor the first call. The peripheral device 118 can bridge the second call to the first call when requested by the subscriber. In various other embodiments the peripheral device 118 can be implemented to accommodate connecting a plurality of calls to the first call. In this manner, e.g., both parents can talk to their children in a telephone conference environment.

Column 210 includes recordings of the first call, i.e., audio recordings of the monitored line. Such recordings are made, e.g., at times when a parent is not able to personally monitor the first call in real time. In accordance with one of the features of the present invention, the peripheral device 118 can maintain a recording of the events at a monitored location. The peripheral device 118 can be implemented to record only when sounds are detected. These recordings can be reviewed by a subscriber at a time when it is most convenient for them.

Columns 212 and 214 include monitoring service user recordings and corresponding play times, respectively. In accordance with the invention, the user is allowed to make personal recordings, e.g., reminders or affectionate words, to their child or parent. In addition, the subscriber is allowed to enter specific times of the day that the recordings will play, e.g., a reminder to take pills or practice the piano.

Columns 216 and 218 include monitoring service user prerecorded message selections and corresponding play times, respectively. In accordance with the invention, the user can choose from a list of prerecorded messages, e.g., children's stories, standard reminders, musical selections, affectionate or inspirational words, jokes, etc. The user also has control over the times these prerecorded message play throughout a day.

Figures 3, 3A:
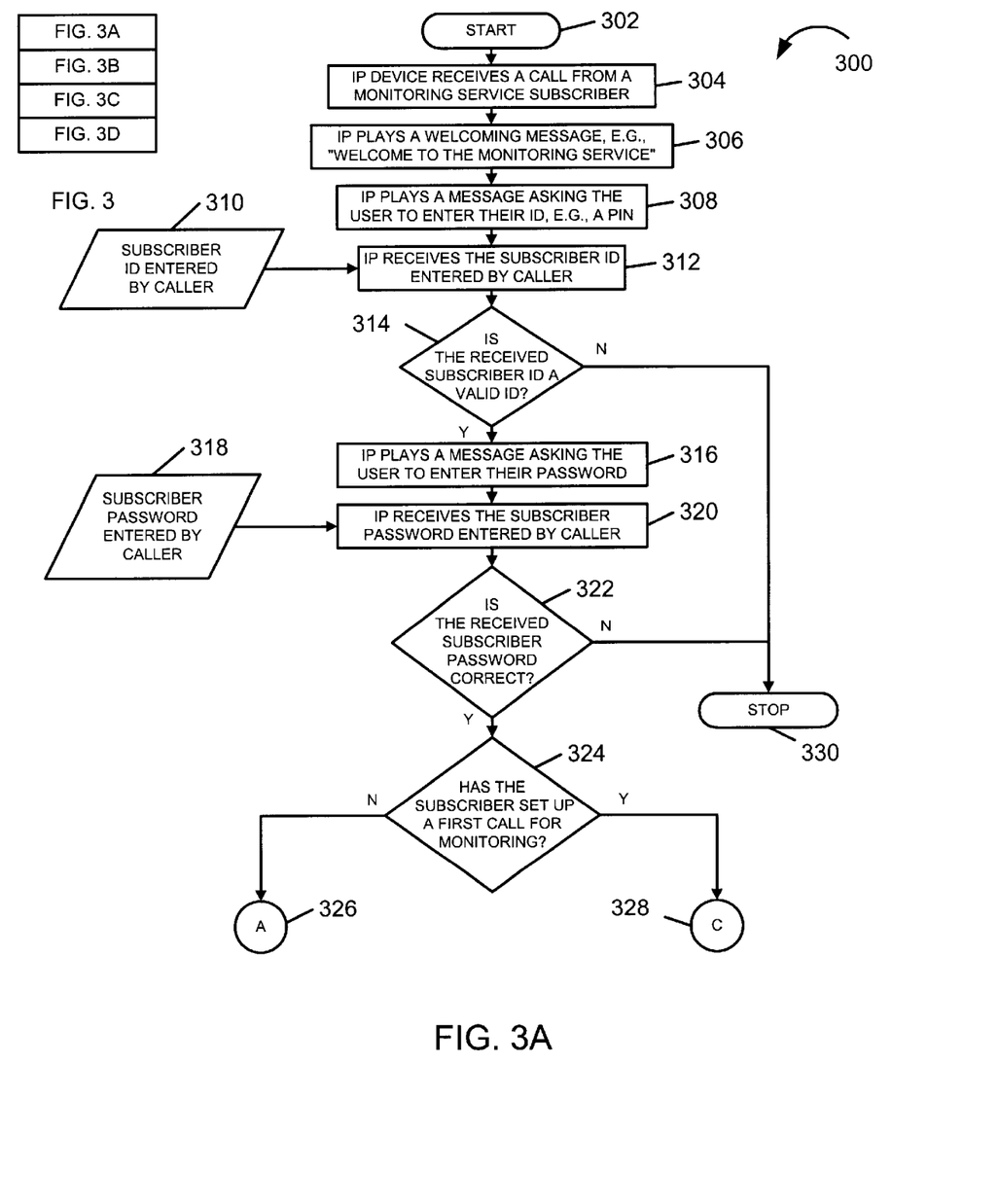
FIG. 3 is a flow diagram illustrating the steps of an exemplary monitoring method of the present invention.

FIG. 3, which comprises the combination of FIGS. 3A, 3B, 3C and 3D illustrates the steps of an exemplary monitoring service method 300 executed by the system 100. The steps illustrated in FIG. 3 may be performed by IP 118. In the exemplary embodiment, the peripheral device 118 is implemented using an intelligent peripheral that includes interactive voice response (IVR) capabilities.

The method 300 will now be described with reference to the system 100 of FIG. 1. The method 300 starts in step 302 with the IP 118 waiting to receive calls following a user subscribing to the monitoring service by registering a user ID and password which is stored in the MSD 120. In step 304 the IP 118 receives a call from a monitoring service subscriber. The call could have been made from either location 1 102 or from location 2 104. In response to the received phone call, in step 306, the IP 118 plays a welcoming message, e.g., "Welcome to the monitoring service". In step 308 the IP 118 proceeds by asking the caller to enter their user ID, e.g., a PIN.

Next, in step 312, the IP 118 receives the subscriber ID 310 entered by the caller. In some embodiments the entered subscriber ID may be DTMF tones representing a PIN. In other embodiments, the IP 118 may be implemented with speech recognition capabilities, thereby allowing the caller to speak their subscriber ID 310. In either embodiment the method 300 proceeds to decision step 314.

In step 314 the IP 118 determines if the subscriber ID 310, received from the caller, is a valid subscriber ID. If the ID 310 is a valid ID, the method 300 proceeds to step 316, but if the ID 310 is not a valid ID, the method 300 stops at step 330. In various embodiments instead of immediately stopping when the IP 118 determines the received ID 310 is not a valid ID, processing returns from step 314 to step 308 to give the caller another chance to enter a valid subscriber ID. This gives the caller a limited number of chances to enter correct information before stopping. Although the method 300 stops in step 330, the IP 118 remains ready to receive calls, e.g., from other monitoring service subscribers.

At step 314, if the received subscriber ID 310 is determined to be a valid ID, the method 300 proceeds to step 316, where the IP 118 plays a message to the caller asking them to enter their password. In step 320, the IP receives a subscriber password 318 from the caller. In decision step 322, the IP 118 determines if the received subscriber password 318 corresponds to the received subscriber ID 310 using the MSD 120. If the password 318 is correct, processing proceeds to step 324. On the other hand if the password 318 is not correct, processing stops at step 330. As with the subscriber ID, in some embodiments rather than proceeding directly to step 330, the IP 118 may give the caller a number of extra chances to enter the correct password by returning from step 322 to step 316. After a number of failures, the method 300 stops at step 330, but the IP 118 remains active to receive phone calls.

In step 324 the IP 118 determines if the subscriber has set up a first call for monitoring. If the subscriber has not set a first call for monitoring the method 300 proceeds to step 332 through connection node 326. If the subscriber has already set up a first call for monitoring the method 300 proceeds from step 324 to step 388 (FIG. 3C) through connection node 328. If the subscriber has not set up a first call for monitoring the operation will proceed from step 324 (FIG. 3B) to step 332 via connection node A 326.

Figure 3B:
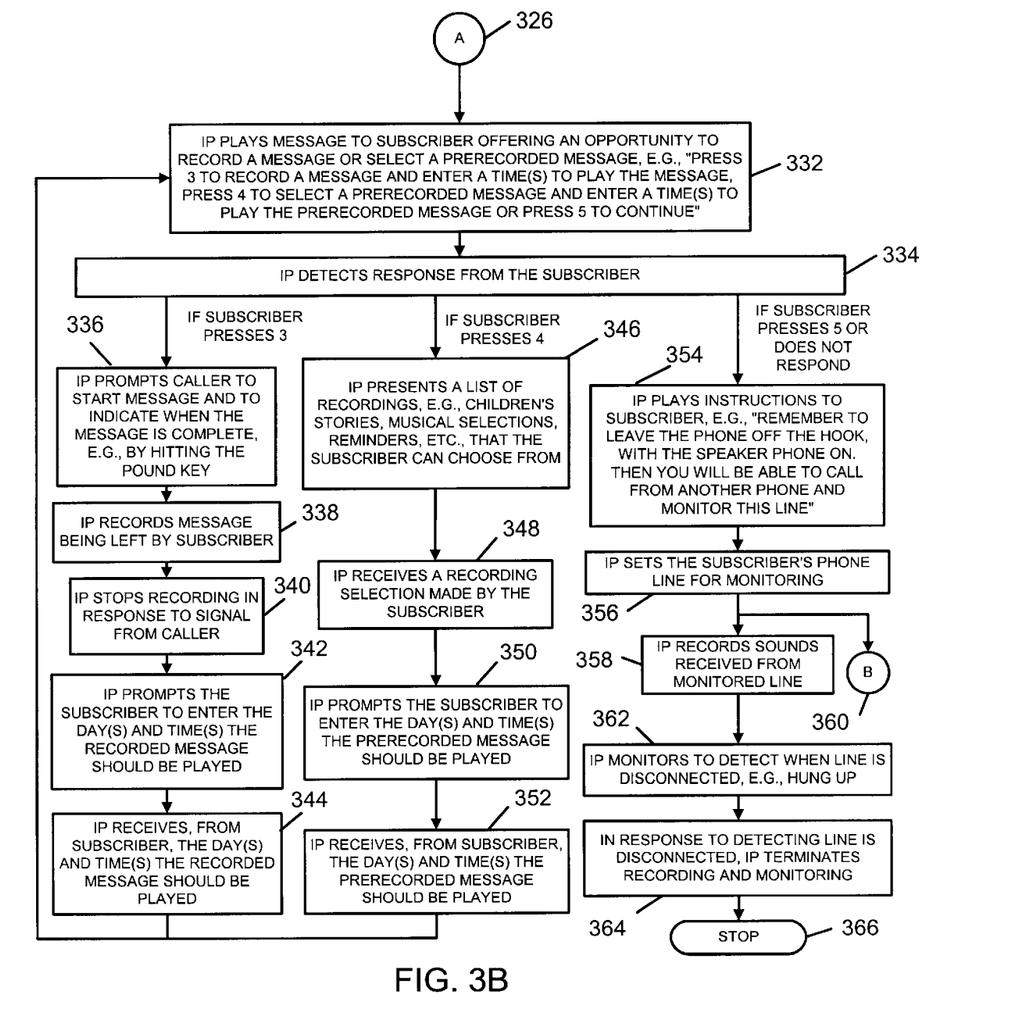

In step 332 the IP 118 plays a message to the subscriber offering an opportunity to record a message, select a prerecorded message or just continue with setting up a monitoring line, e.g., "Press 3 to record a message and enter a time(s) to play the message, press 4 to select a prerecorded message and enter a time(s) to play the prerecorded message or press 5 to continue". In step 334, the IP 118 detects a response from the subscriber.

If the subscriber presses 3, the method 300 proceeds to step 336, where the IP 118 prompts the caller to start their message and to indicate when the message is complete, e.g., by pressing the pound key. In step 338 the IP 118 records the message being left by the subscriber, and in step 340 the IP 118 stops recording in response to a signal from the caller. Once the message is recorded, the method 300 proceeds to step 342, where the IP 118 prompts the subscriber to enter the day(s) and time(s) they wish the recorded message to be played. In step 344, the IP 118 receives the desired day(s) and time(s). Next, the method 300 returns to step 332, providing the subscriber with the aforementioned options.

Returning to step 334, if the IP 118 receives a 4 from the subscriber, the method 300 proceeds to step 346, where the IP 118 presents the subscriber with a list of prerecorded messages, e.g., children's stories, reminders, musical selections, affectionate or inspirational words, jokes, etc., from which to choose. Then, in step 348, the IP 118 receives a selection from the subscriber. In response to the received selection, the method 300 proceeds to step 350, where the IP 118 prompts the subscriber to enter the day(s) and time(s) the prerecorded message should be played. Then, in step 352, the IP 118 receives the day(s) and time(s), the subscriber wishes the selected prerecorded message should play. Next, the method 300 returns to step 332, providing the subscriber with the aforementioned options.

Returning to step 334, if the IP 118 receives a 5 from the subscriber or does not receive a response from the subscriber, e.g., in 4 seconds, the method 300 proceeds to step 354. Automatically setting the phone line for monitoring when no response is detected allows a subscriber to quickly set up a monitoring line by only having to enter an ID and a password. In step 354, the IP 118 plays instructions to the subscriber, e.g., "Remember to leave the phone off the hook, with the speaker phone on. Then you will be able to call from another phone and monitor this line". Then, in step 356, the IP sets the subscriber's phone line for monitoring. The subscriber can now leave the phone off the hook and proceed with their day.

A monitoring service subscriber may not want to be troubled with configuration and message options when enabling the monitoring service, e.g., while rushing out to work. In order to address this, in another embodiment of the invention, steps 332 through 352 are not offered to the subscriber when proceeding from step 324. Instead, the method 300 proceeds directly from step 324 to step 354. This embodiment can be used by busy parents who want to leave the house as quickly as possible, and do not have time to leave prerecorded messages before setting up the monitored line. In such an embodiment, the service subscriber can call in and leave messages from another telephone line, e.g., at any time during the day, as will be discussed below with reference to FIG. 3D.

Following step 356, the method 300, branches off into two parallel paths. The first path beginning with step 358 addresses recording of sounds received from the monitored line while the second processing path 360 provides the opportunity to make calls from the monitored residence.

Along the first path, in step 358, the IP 118 records sounds received from the monitored line. The recording of sounds ensures that the parent will not miss anything important while they are not physically monitoring the line themselves. The subscriber can access these recorded sounds at a later time. The method 300 proceeds from step 358 to step 362.

In step 362, the IP 118 monitors to detect when the line is disconnected, e.g., hung up. Then, in step 364, in response to detecting the monitoring line as disconnected, the IP 118 terminates any recording and monitoring. The method 300 stops at node 366, but the IP 118 remains active and can receive phone calls.

The second path proceeding from step 358 begins in step 368 (FIG. 3C) which is reached via connection node 360. In step 368, the IP 118 listens for, e.g., monitors to detect, DTMF tones on the monitored line. Then, in step 370, the IP 118 begins to receive dialed digits from the monitored line.

Figure 3C:
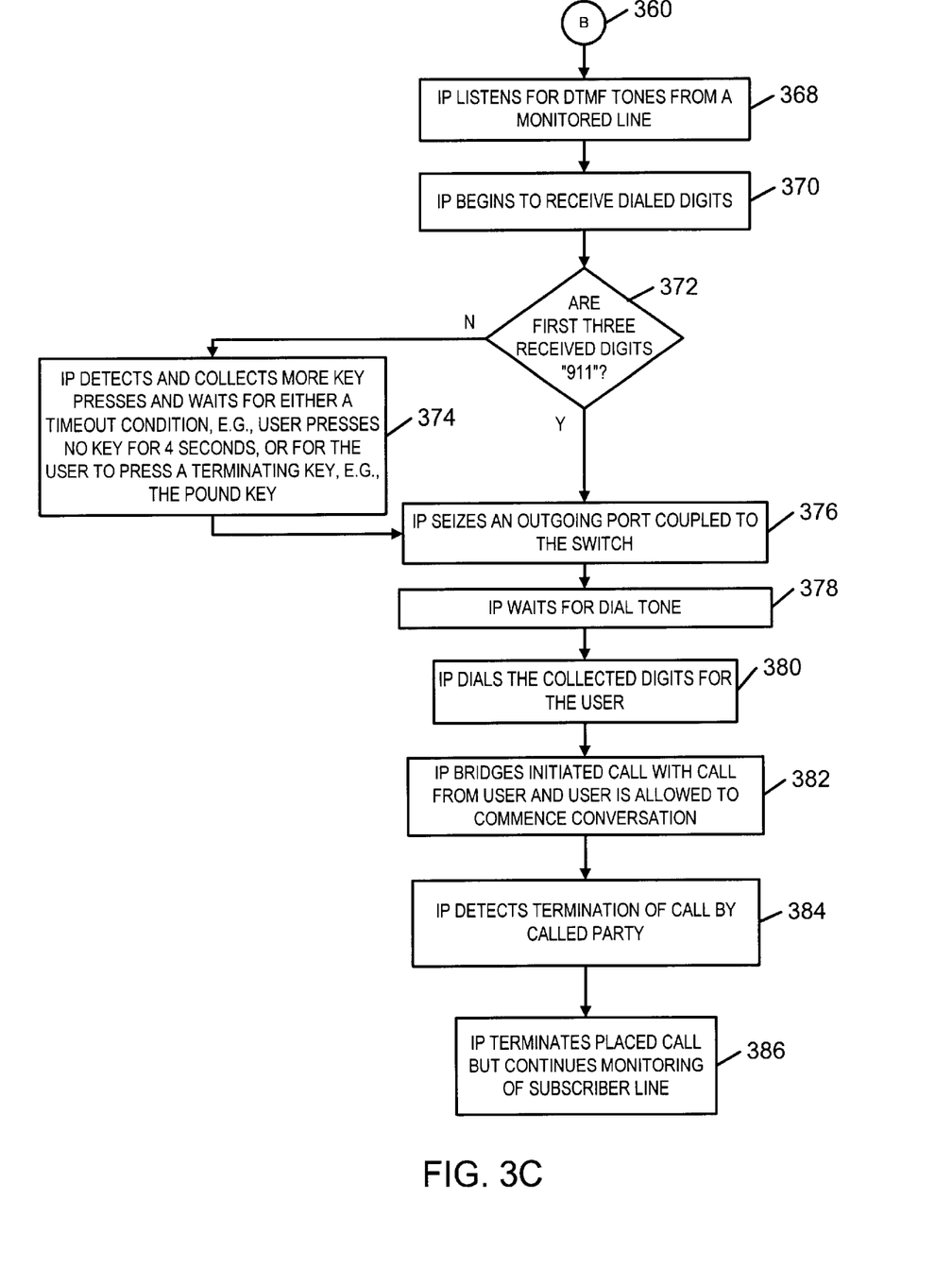

In decision step 372, the IP 118 determines if the first three digits received from the monitored line are "911". If the first three digits are not "911" the method 300 proceeds to step 374, where the IP 118 detects and collects more key presses and waits for either a timeout condition, e.g., user presses no key for 4 seconds, or for the user to press a terminating key, e.g., the pound key. Then the method 300 proceeds from step 374 to step 376. However, if in step 372 it is determined that the first three digits are "911", processing proceeds directly to step 376. In some embodiments, the IP 118 is implemented to automatically call subscribers, e.g., parents, older siblings, in the event "911" is dialed at the monitoring location in addition to proceeding as described below. This allows the parents of a child to be immediately aware of any emergencies at the home.

In step 376 the IP 118 seizes an outgoing port coupled to the telephone switch 116. Then, in step 378, the IP 118 waits for a dial tone from the switch 116. Next, in step 380, after receiving the dial tone, the IP 118 dials the collected digits for the user. In step 382, the IP 118 bridges the initiated call with the monitored line and the user is allowed to commence their conversation. Once the conversation is over, in step 384, the IP 118 detects termination of the call by the called party. Then, in step 386, the IP 118 terminates the placed call, but continues monitoring of the subscriber line. In some embodiments the IP may stop or pause the recording of sounds from the first line during the time the initiated and first calls are bridged.

In various embodiments, voice dialing is supported. In such embodiments, the IP 118 may be implemented to recognize words, digits and/or other speech and to perform actions in response to the words and/or voices. For example, the IP 118 may be implemented to automatically call a parent's cell phone when a child says "mom" or "mommy". In such embodiments, monitoring for words, phrases and/or spoken digits is performed in parallel with DTMF monitoring step 368. In this manner a call may be initiated using DTMF digits or speech.

Figure 3D:
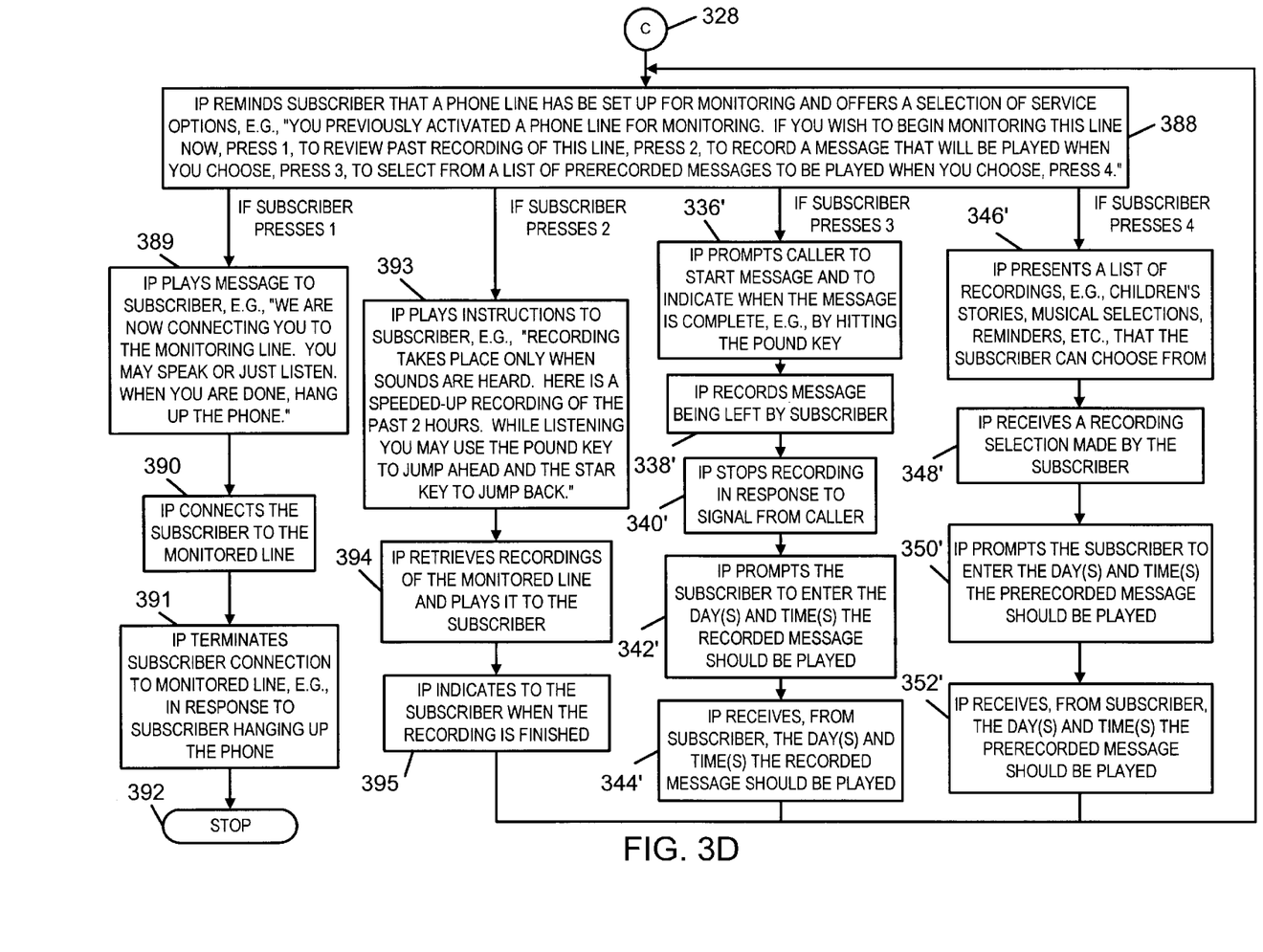

Having described how to enable monitoring using a speakerphone and telephone line, the step associated with accessing a monitored line recordings made via monitoring and/or other setup features via a second telephone line will now be described with reference to FIG. 3D. Step 388 of FIG. 3D is reached via connection node 328 from previously described step 324.

Returning to step 324, assuming the subscriber has already set up a first call for monitoring, e.g., the caller is calling from location 2 104 to monitor location 1 102, processing proceeds to step 388 through connection node 328. The IP 118 can access the MSD 120, in step 324, to determine if the caller has already set up a first call for monitoring.

In step 388, the IP 118 reminds the subscriber that a phone line has be set up for monitoring and offers a selection of service options, e.g., "You previously activated a phone line for monitoring. If you wish to begin monitoring this line now, press 1, to review past recording of this line, press 2, to record a message that will be played when you choose, press 3, to select from a list of prerecorded messages to be played when you choose, press 4."

If the subscriber presses "1", they wish to be connected to the monitoring line, so operation proceeds to step 389, where the IP 118 plays a message, e.g., instructions, to the subscriber, e.g., "We are now connecting you to the monitoring line. You may speak or just listen. When you are done, hang up the phone." Then, in step 390, the IP 118 connects the subscriber to the monitored line, e.g., by bridging the first and second calls. Now the parent can talk to their child through the speakerphone or listen to a caretaker as they work. In step 391, the IP 118 terminates the subscriber's connection, i.e., call 2, e.g., in response to the subscriber hanging up the phone. Processing of the second call from the subscriber stops at node 392, but the IP 118 remains active and ready to receive calls.

Returning to step 388, if the subscriber presses a "2", they want to listen to past recordings of the monitoring line so operation proceeds to step 393, where the IP 118 plays instructions to the subscriber, e.g., "recording takes place only when sounds are heard. Here is a speeded-up recording of the past 2 hours. While listening you may use the pound key to jump ahead and the star key to jump back." In step 394, the IP 118 retrieves recording of the monitored line and plays it to the subscriber. Then, in step 395, the IP 118 indicates to the subscriber when the recording is finished. Then, the method 300 returns to step 388, and provides the subscriber with the above mentioned service options.

At step 388, if the subscriber presses a "3", it indicates the subscriber wants to record a message and set up times to play the message. Therefore operation proceeds to recording and time setting steps 336' through 344'. These steps are the same as previously described steps 336 through 344. Following step 344', the method 300 returns to step 388, and provides the subscriber with the above mentioned service options.

At step 388, if the subscriber presses a "4", they want to select message(s) from a selection of prerecorded messages and set up times to play the prerecorded message(s). Therefore operation proceeds to prerecord message selection and time setting steps 346' through 352'. These steps are the same as previously described steps 346 through 352. Following step 352', the method 300 returns to step 388, and provides the subscriber with the above mentioned service options.

The monitoring service of the invention uses a home's phone line for the duration of its use. The monitoring service of the present invention is compatible with a voice mail and/or a call forwarding service, allowing calls to the monitoring line to be forwarded to a phone number indicated by the subscriber or to a voice mail system. Call forwarding on busy line (CFBL) is a standard means by which calls are forwarded. Since the line used for monitoring will be busy, CFBL may, and in various embodiments is, used to provide call forwarding when monitoring is enabled.

Standard voice mail services can be used in conjunction with the monitoring service as an alternative to call forwarding.

Forwarding telephone calls to the subscriber relieves a child of any pressures from having to answer the telephone. In addition, strangers or telemarketers will not have telephone access to the child, and any important messages will not be lost as a result of a child's poor memory. While a caller ID service could be used to protect a child from strange phone calls instead of the monitoring service in conjunction with call forwarding and/or voice mail, the caller ID service is not effective if the child does not know how to read, or if the parent is calling from a different location that the child does not recognize.

Numerous variations on the above described methods and apparatus are possible without departing from the scope of the invention.

What is claimed is:

1. A method of providing a monitoring service, the method comprising the steps of:

receiving a first telephone call from a speakerphone located at a remote monitored location;

recording audio signals received from said speakerphone;

receiving a second telephone call from a telephony device other than said speakerphone;

supplying at least some of the recorded audio signals to said telephony device via said second call while said first telephone call is still ongoing; and storing an audio recording to be supplied to said speakerphone at an indicated time.

2. The method of claim 1, further comprising the step of:

bridging said first and second calls for a period of time during which said recorded audio signals are not being supplied to said telephony device.

3. The method of claim 1, further comprising the step of:

receiving information specifying the time said audio recording is to be supplied to the speakerphone via said first telephone call, said specified time being said indicated time.

4. The method of claim 3, wherein said step of storing includes:

storing a plurality of audio recordings corresponding to at least one of stories and music.

5. The method of claim 3, wherein said step of storing includes:

recording a message from a monitoring service subscriber to be played back at the specified time.

6. The method of claim 1, further comprising the steps of:

monitoring the first telephone call to detect DTMF tones; and in response to detecting DTMF tones corresponding to a telephone number, placing a call to said telephone number.

7. The method of claim 6, wherein each of said receiving, recording, supplying and monitoring steps is performed by a peripheral device coupled to a telephone switch, the step of placing a call in response to detecting DTMF tones including:

operating the peripheral device to initiate a call to the telephone number corresponding to the detected DTMF tones through said switch; and bridging the initiated call and said first call.

8. The method of claim 7, further comprising the steps of:

operating the peripheral device to bridge the first and second calls for at least a portion of the duration of the first call to allow real time monitoring of audio signals received by the speakerphone by a user of said telephony device.

9. The method of claim 7, further comprising:

terminating the initiated call in response to detecting that the called party has hung up; and continuing to record audio signals received from said speakerphone following termination of said initiated call.

10. The method of claim 9, further comprising:

pausing recording of audio signals from said speakerphone while the first call is bridged to the initiated call.

11. A method of providing a monitoring service, the method comprising the steps of:

operating a peripheral device coupled to a telephone switch to receive a first telephone call from a speakerphone;

operating the peripheral device to monitor the first call for DTMF signals from the first telephone;

in response to detecting a DTMF signal corresponding to a telephone number operating the peripheral device to initiate a call to said telephone number and to bridge said first telephone call and said initiated call;

operating the peripheral device to receive a second telephone call from a telephony device other than said speakerphone; and operating the peripheral device to bridge said first and second telephone calls.

12. The method of claim 11, which said peripheral device maintains said first call when either said initiated call or said second call is terminated by the called party or the calling party, respectively.

13. The method of claim 11, further comprising:

recording audio signals received from the speakerphone; and playing at least some of the recorded audio signals to the caller initiating said second call during a period of time when said first and second calls are not bridged.

14. The method of claim 13, further comprising the step of:

operating the peripheral device to provide an audio version of a story or a song to said speakerphone at a time specified by a user of said monitoring service via said first call.

15. A system for providing a monitoring service, the system comprising:

a telephone switch for receiving telephone calls;

a peripheral device coupled to said telephone switch, the peripheral device including:

i. receiver circuitry for receiving first and second telephone calls directed to said peripheral device by said telephone switch wherein said first telephone call is from a remote monitored location;

ii. an audio recorder for recording audio signals received from said first telephone call;

iii. means for supplying at least some of the recorded audio signals corresponding to the first telephone call to a caller via said second call while said first telephone call is still ongoing; and iv. means for storing an audio recording to be supplied to said first telephone call at an indicated time.

16. The system of claim 15, wherein the peripheral device further includes:

a memory for storing information about a time of day at which said audio recording is to be played on said first telephone call.

17. The system of claim 16, wherein the peripheral device further comprises:

means for detecting DTMF signals corresponding to a telephone number received via said first telephone call;

means for initiating a call to the telephone number corresponding to the detected DTMF signals; and bridging circuitry for bridging the first telephone call and the initiated telephone call.

18. The system of claim 17, further comprising:

a speakerphone located at said remote monitored location for initiating said first telephone call; and a communications line coupling said speakerphone to said telephone switch.

19. The system of claim 18, further comprising a telephony device located at a location physically remote from said speakerphone for initiating said second call.

* * * * *